United States Patent
Chu et al.

(10) Patent No.: US 8,543,801 B2
(45) Date of Patent: Sep. 24, 2013

(54) BOOTING METHOD USING A BACKUP MEMORY IN PLACE OF A FAILED MAIN MEMORY

(75) Inventors: Shao-Kang Chu, Taipei (TW); Hsu-Hung Cheng, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 685 days.

(21) Appl. No.: 12/699,049

(22) Filed: Feb. 3, 2010

(65) Prior Publication Data

US 2010/0211767 A1 Aug. 19, 2010

(30) Foreign Application Priority Data

Feb. 16, 2009 (TW) .............................. 98104839 A

(51) Int. Cl.
*G06F 15/177* (2006.01)
*G06F 9/24* (2006.01)
*G06F 9/00* (2006.01)
*G06F 11/00* (2006.01)
*G11C 29/00* (2006.01)

(52) U.S. Cl.
USPC ............. 713/2; 713/1; 713/100; 714/6.1; 714/6.32; 714/42; 714/710; 714/718

(58) Field of Classification Search
None
See application file for complete search history.

(56) References Cited

U.S. PATENT DOCUMENTS

| | | | | |
|---|---|---|---|---|
| 5,279,029 | A * | 1/1994 | Burns | 29/856 |
| 5,850,562 | A * | 12/1998 | Crump et al. | 713/1 |
| 6,038,680 | A * | 3/2000 | Olarig | 714/6.1 |
| 6,178,526 | B1 * | 1/2001 | Nguyen et al. | 714/42 |
| 6,253,319 | B1 * | 6/2001 | Tran et al. | 713/1 |
| 6,473,856 | B1 * | 10/2002 | Goodwin et al. | 713/2 |
| 7,162,627 | B2 | 1/2007 | Chen | |
| 7,272,709 | B2 * | 9/2007 | Zitlaw et al. | 713/2 |
| 7,716,506 | B1 * | 5/2010 | Surgutchik et al. | 713/321 |
| 7,752,490 | B2 * | 7/2010 | Abe | 714/6.32 |
| 8,015,438 | B2 * | 9/2011 | Bruennert et al. | 714/6.13 |
| 2002/0013881 | A1 | 1/2002 | Delp et al. | |
| 2005/0102568 | A1 | 5/2005 | Billick et al. | |
| 2006/0004978 | A1 | 1/2006 | Nakayama | |

FOREIGN PATENT DOCUMENTS

| | | |
|---|---|---|
| CN | 1030653 | 1/1989 |
| CN | 1302016 | 7/2001 |
| CN | 1567228 | 1/2005 |

* cited by examiner

*Primary Examiner* — Ji H Bae
(74) *Attorney, Agent, or Firm* — Jianq Chyun IP Office

(57) ABSTRACT

A method for booting a computer system is disclosed. The computer system has a main memory. The method includes the steps of providing a backup memory, replacing the main memory by the backup memory when the computer system is booted and the main memory fails to operate normally, and decompressing the program codes of the BIOS to the backup memory to perform the backup booting procedure.

4 Claims, 6 Drawing Sheets

BOOTING METHOD USING A BACKUP MEMORY IN PLACE OF A FAILED MAIN MEMORY

CROSS-REFERENCE TO RELATED APPLICATION

This application claims the priority benefit of Taiwan application serial no. 98104839, filed on Feb. 16, 2009. The entirety of the above-mentioned patent application is hereby incorporated by reference herein and made a part of specification.

BACKGROUND OF THE INVENTION

1. Field of the Invention

The invention relates to a method for booting a computer system and, more particularly, to a method for booting a computer system having a built-in memory.

2. Description of the Related Art

When the computer system is booted, if the user uses a downgrade or unqualified memory module, the computer system often becomes unstable, and it even crashes. If the system crashes, the computer fails to prompt the user about the reason for the occurrence of the error. Thus, the user cannot determine where the error occurs, and the user has to turn to the custom service for help or make it repaired by a maintenance department, which not only disturbs the user, but also burdens the custom service of the manufacturer and the maintenance department.

To avoid the occurrence of the above problem, computer system engineers or motherboard engineers perform the compatibility test with memory modules on the market as much as possible in the research and development. If the compatibility problem occurs, the engineers adjust and find out optimum parameters for an individual memory. However, repeated "adjustment" and "test" consume large research, development and verifying resources and the occurrence of the compatibility problem cannot be avoided if the user uses the downgrade memory module for which the parameters have not been adjusted.

BRIEF SUMMARY OF THE INVENTION

The invention provides a memory circuit on a motherboard and a computer system, and the computer system may be booted by itself via a built-in memory when an incompatible memory is used.

The invention provides a method for booting a computer system, and the computer system may be booted by itself when an incompatible memory is used. In addition, self-training may be performed to find out most proper memory parameters.

The invention provides a memory circuit on a motherboard. The memory circuit includes a main memory, a backup memory, a selector, a selection controller and a memory controller. The selection controller is coupled to the selector and may output a selection signal to the selector according to a booting condition of the computer system. The selector is coupled to the main memory and backup memory. The memory controller is coupled to the selector. The selector is coupled to one of the main memory and the backup memory selectively according to the selection signal to allow the memory controller to access the main memory or the backup memory via the selector.

In one embodiment of the invention, the main memory is pluggably disposed in the memory circuit of the motherboard, and the backup memory is fixedly disposed in the memory circuit of the motherboard.

The invention also provides a computer system including a computation processing module, a main memory, a backup memory and a BIOS unit. The computation processing module is coupled to the main memory, backup memory and the BIOS unit, respectively. The BIOS unit is in charge of the booting procedure of the computer system. If the BIOS unit checks and finds out that the main memory fails to operate normally when the computer system is booted, it informs the computation processing module to allow the computation processing module to decompress the program codes stored in the BIOS unit to the backup memory.

The invention further provides a method for booting a computer system. The method includes the following steps. A backup memory is provided. When the computer system is booted, and the main memory in the computer system fails to operate normally, the main memory is replaced by the backup memory. Afterward, the program codes of the BIOS are decompressed to the backup memory to perform a backup booting procedure.

In one embodiment of the invention, if the computer system is booted, and the main memory is checked to the normal, the program codes of the BIOS are decompressed to the main memory to finish a normal booting procedure of the computer system.

In one embodiment of the invention, the method further includes the step of initializing the backup memory when the backup memory replaces the main memory.

To sum up, in the invention, a computer system may be booted by itself via a built-in memory which may allow the computer system to perform basic operation when an incompatible memory is used. Furthermore, a smart memory parameter adjusting program may used cooperatively to further find out most proper memory parameters. Even if the parameters for stable operation cannot be obtained, a user may be alarmed and informed about the error detecting result.

These and other features, aspects, and advantages of the present invention will become better understood with regard to the following description, appended claims, and accompanying drawings.

DETAILED DESCRIPTION OF THE EMBODIMENTS

Figure 1:
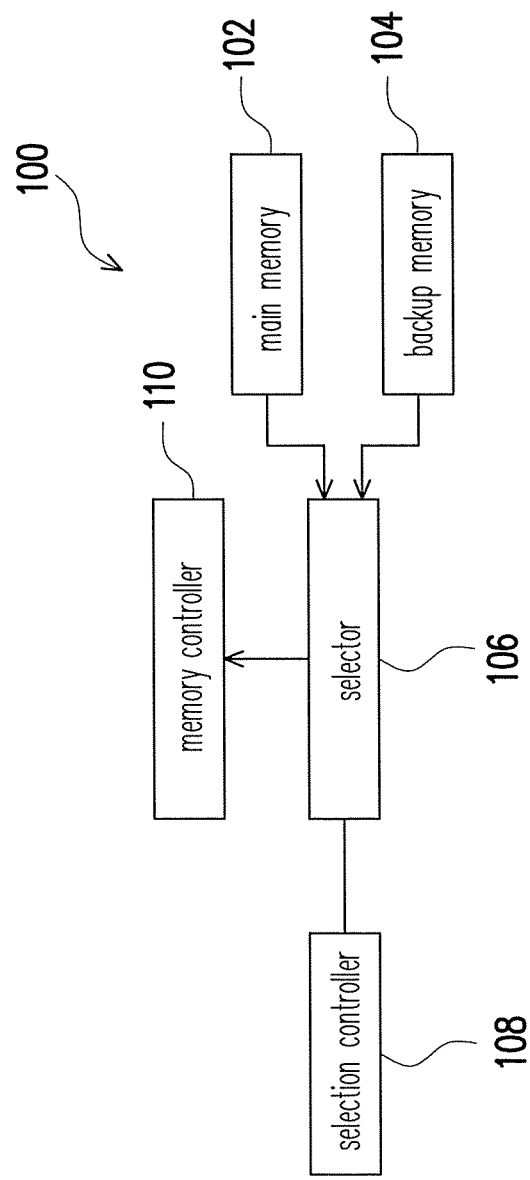
FIG. 1 is a schematic diagram showing a memory circuit on a motherboard according to a preferred embodiment of the invention.

FIG. 1 is a block diagram showing the memory circuit on a motherboard according to a preferred embodiment of the invention. The memory circuit 100 on the motherboard may be used in a computer system, and it may include a main memory 102, a backup memory 104, a selector 106, a selection controller 108 (such as an IO controller hub) and a memory controller 110. The main memory 102 in the memory circuit 100 on the motherboard may be a pluggable device (such as DDR RAM, SDRAM), and the backup memory 104 is fixedly disposed in the memory circuit 100 on the motherboard. The selection controller 108 is coupled to the selector 106, and it may output a selection signal to the selector 106 according to the booting condition of the computer system.

In addition, the memory controller 110 is coupled to the selector 106, and the selector 106 may select to be coupled to the main memory 102 or the backup memory 104 according to the selection signal. Thus, the memory controller 110 may access the main memory 102 or the backup memory 104 via the selector 106. Via the memory circuit 100 on the motherboard according to the embodiment, the computer system may be booted with a different memory in a different condition. Different embodiments are illustrated to describe the application of the memory circuit 100 on the motherboard in detail.

First Embodiment

Figure 2:
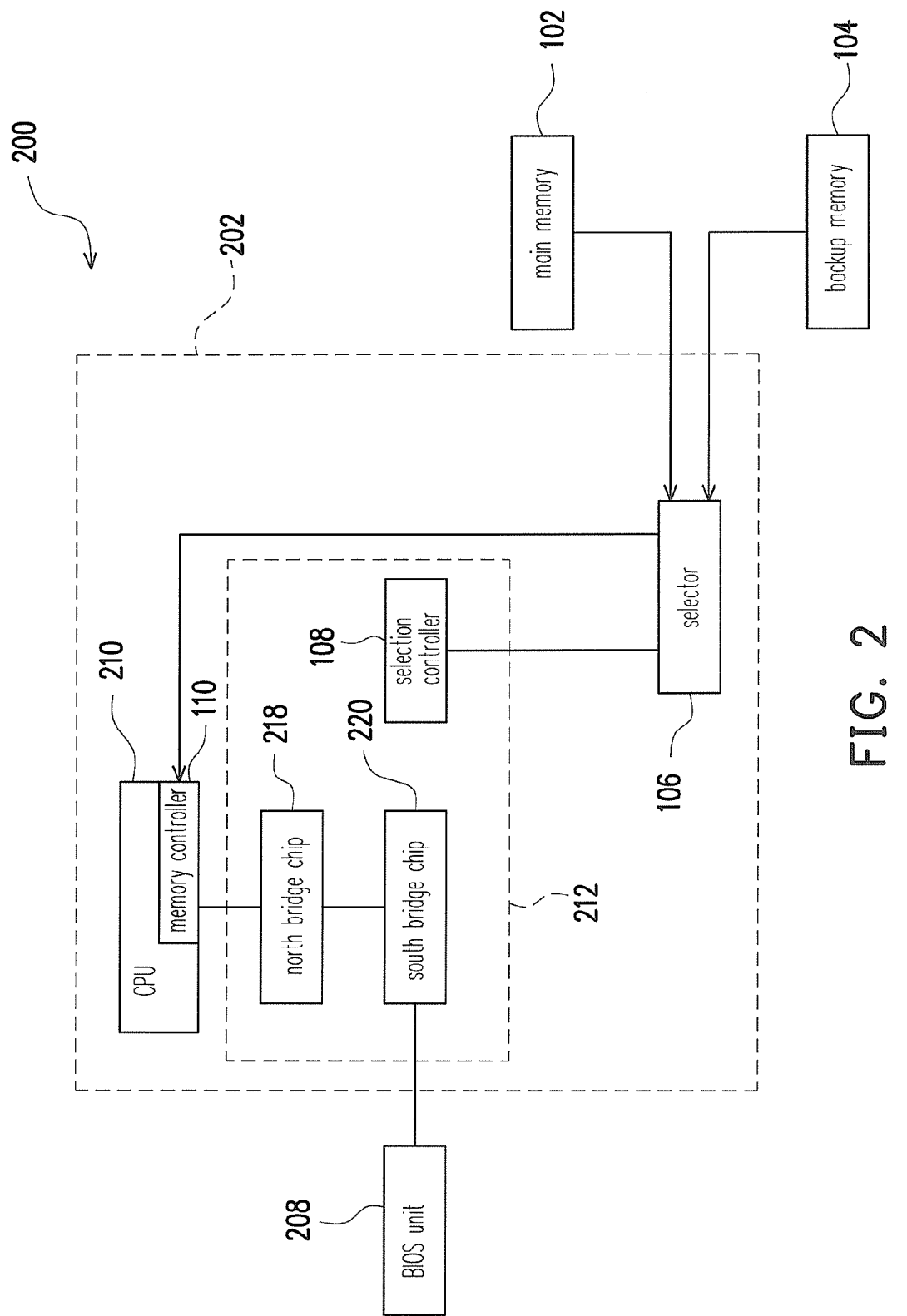
FIG. 2 is a schematic diagram showing a computer system according to a preferred embodiment of the invention.

FIG. 2 is a block diagram showing a computer system according to a first embodiment of the invention. The computer system 200 includes a main memory 102, a backup memory 104, a computation processing module 202 and a basic input/output system (BIOS) unit 208. The BIOS unit 208, the main memory 102 and the backup memory 104 all may be coupled to the computation processing module 202. The main memory 102, the backup memory 104, the selector 106, the selection controller 108 and the memory controller 110 in this embodiment form the memory circuit 100 on the motherboard in the former embodiment.

In the embodiment, the main memory 102 is pluggably disposed at the memory circuit 100 on the motherboard. Thus, the user may detach and replace the main memory 102 by him or her. The backup memory 104 is preferred to be built-in and fixed on the memory circuit 100 on the motherboard, and the user cannot detach the backup memory. The BIOS unit 208 is in charge of the booting procedure of the computer system 200. The computation processing module 202 may include a CPU 210, a chipset 212 and a selector 106. The CPU 210 is coupled to the chipset 212 and the selector 106.

In addition, the chipset 212 also may be coupled to the selector 106, and it also may be coupled to the BIOS unit 208. The selector 106 may be coupled to the main memory 102 and the backup memory 104. The CPU 210 may be in charge of the operation of the computer system 200, and it may communicate or transfer data with other elements in the computer system 200 via the chipset 212. In the embodiment, the CPU 210 may have a built-in memory controller 110 which may be coupled with the selector. Thus, the CPU 210 may access the main memory 102 or the backup memory 103 via the selector 106. The chipset 212 may output a selection signal to the selection controller 108 according to the booting condition of the computer system 200 when the computer system 200 is in the booting procedure.

The chipset 212 may include a north bridge chip 218, a south bridge chip 220 and a selection controller 108. The south bridge chip 220 may be coupled to the north bridge chip 218 and the BIOS unit 208. The north bridge chip 218 may process high speed signals (such as communicating signals between the CPU 210, RAM and south bridge chip 220). The south bridge chip 220 may process I/O control signals and communicate with the CPU 210 via the north bridge chip 218. The selection controller 108 may be coupled to the selector 106 to transmit a selection signal to the selector 106.

Figure 3:
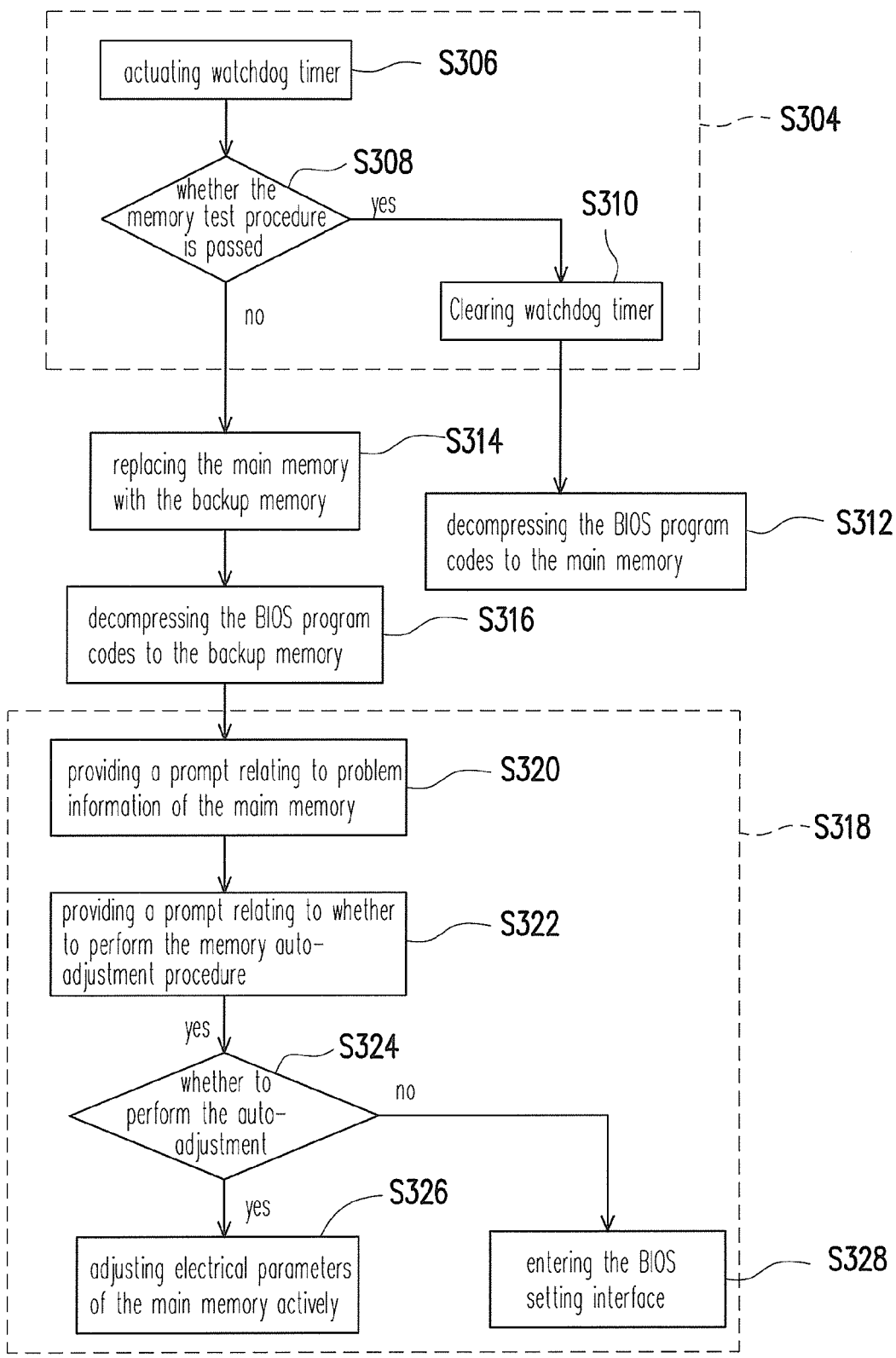
FIG. 3 is a flow chart showing steps of a method for booting a computer system according to a preferred embodiment of the invention.

FIG. 3 is a flow chart showing a method for booting a computer system according to an embodiment of the invention. As shown in FIG. 2 and FIG. 3, when the computer system 200 is in a booting procedure, the main memory 102 is checked to determine whether it operates normally (step S304). In detail, in step S304, a Watchdog Timer may be actuated first to generate a time counting value (step S306). Then, whether the main memory 102 may pass a memory test procedure before the time counting value reaches a preset time is determined (step S310). If yes, the main memory 102 is determined to be normal, and the Watchdog Timer is cleared (step S310). Then, the program codes stored in the BIOS unit 208 is decompressed from the flash memory to the main memory 102 (step S312) to finish a normal booting procedure of the computer system 200. If no, the main memory 102 is determined to be failed to operate normally, and the backup memory 104 is used to replace the main memory 102 and initialized. (Step S314). Afterward, the program codes of the BIOS unit 208 are decompressed to the backup memory 104 (step S316) to perform a backup booting procedure (step S318).

For example, when the BIOS unit 208 checks and finds out that the main memory 102 fails to operate normally, it may informs the computation processing module 202 to allow the selection controller 18 in the chipset 212 to output a selection signal to the selector 106. After the selector 106 receives the selection signal, it may be coupled to the backup memory 104. Thus, the computation processing module 202 may decompress the program codes stored in the BIOS unit 208 to the backup memory 104. Then, the memory controller 110 accesses the backup memory 104 instead of the main memory 102 to perform the booting procedure of the computer system 200.

In detail, in step S318, the user may be prompted about the problem information of the main memory 102 first (step S320). Then, the user is prompted about whether to perform a memory auto-adjustment procedure (step S322). Then, the user may select whether to perform the memory auto-adjustment procedure (S324). If yes, the memory auto-adjustment procedure is performed, and the electrical parameters of the main memory 102 are actively adjusted (step S326). If no, the setting interface of the BIOS unit 208 is entered.

Figure 4:
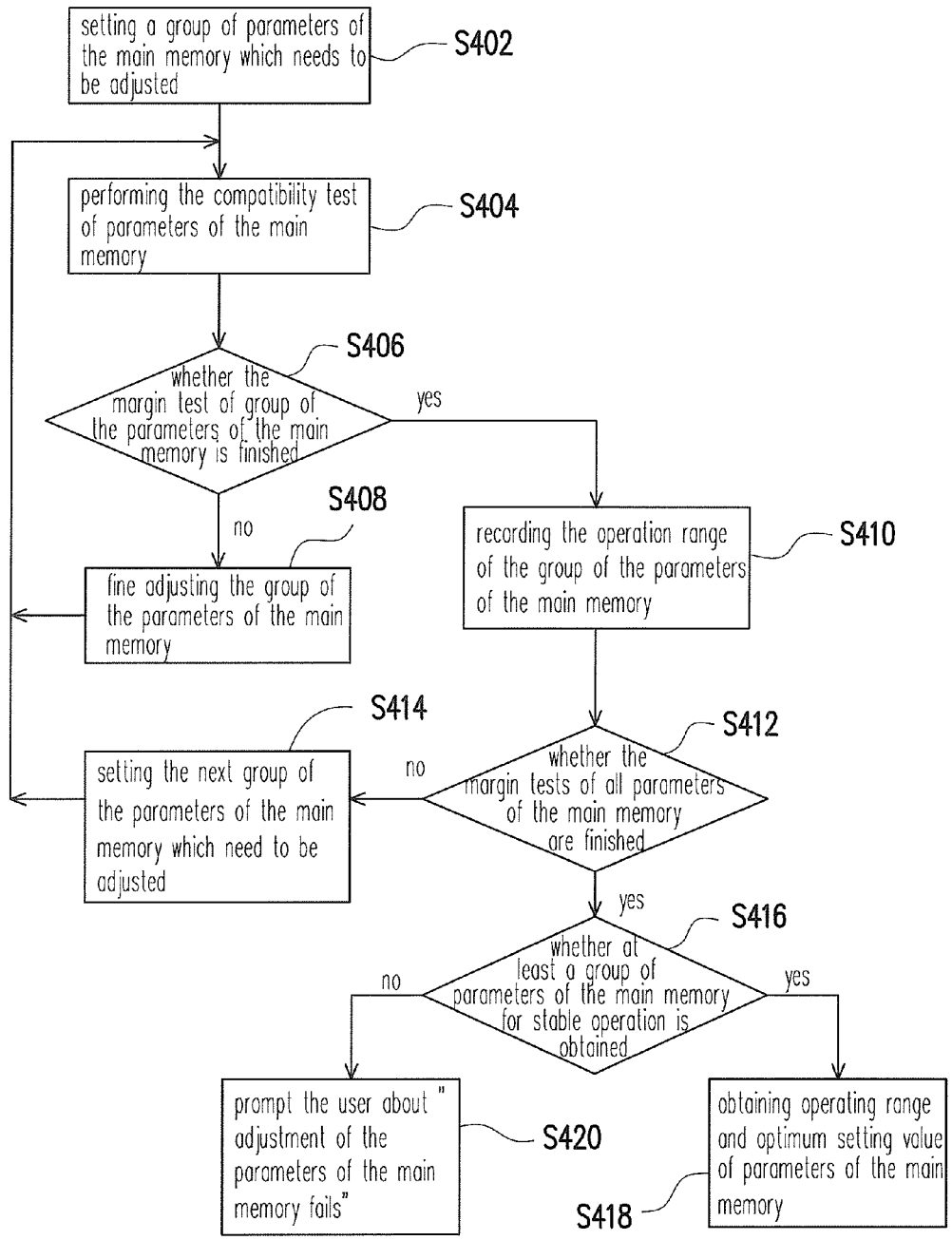
FIG. 4 is a flow chart showing steps of a method for actively adjusting the time parameter of the main memory according to a preferred embodiment of the invention.

In step S326, the electrical parameters of the main memory 102 may be DRAM timing parameters (such as CAS Latency), clock parameters (such as frequency), voltage parameters (such as memory controller core voltage) or reference voltages (such as memory controller reference voltage). FIG. 4 is a flow chart showing a method for actively adjusting parameters of the main memory 102. A group of parameters of the main memory 102 which needs to be adjusted is set (step S402) to perform the parameter compatibility test of the main memory (step S404). Then, whether the margin test of the group of the parameters is finished is examined (step S406). If no, the group of the parameters is fine adjusted (step S408). If yes, the operating range of the group of the parameters is recorded (step S410).

For example, when the timing parameter of the main memory 102 is adjusted, the original timing parameter of the main memory 102 is set first to perform the time parameter test of the main memory 102. The timing parameter value of the main memory 102 is increased by one gradually, and the compatibility of the timing parameter of the main memory 102 is tested. When the timing parameter of the main memory 102 reaches a preset timing parameter value, the original timing parameter value of the main memory 102 is decreased by one gradually, and the compatibility of the time parameter of the main memory 102 is tested. By fine adjusting the timing parameter of the main memory 102 gradually to determine whether to be compatible, the operating range and optimum parameter value of the timing parameter of the main memory 102 may be recorded.

Afterward, whether the margin tests of all of the parameters of the main memory 102 are finished is examined (step S412). If no, the next group of parameters of the main memory 102 which needs to be adjusted is adjusted (step S414). If yes, whether at least a group of parameters which may make the operation stable is obtained is examined (step S416). If yes, the operating range and the optimum setting value of the parameters of the main memory 102 are obtained (step S418) to boot the computer, and if no, the user is prompted about the adjustment failure of the parameter of the main memory 102 (step S420).

Second Embodiment

Figure 5:
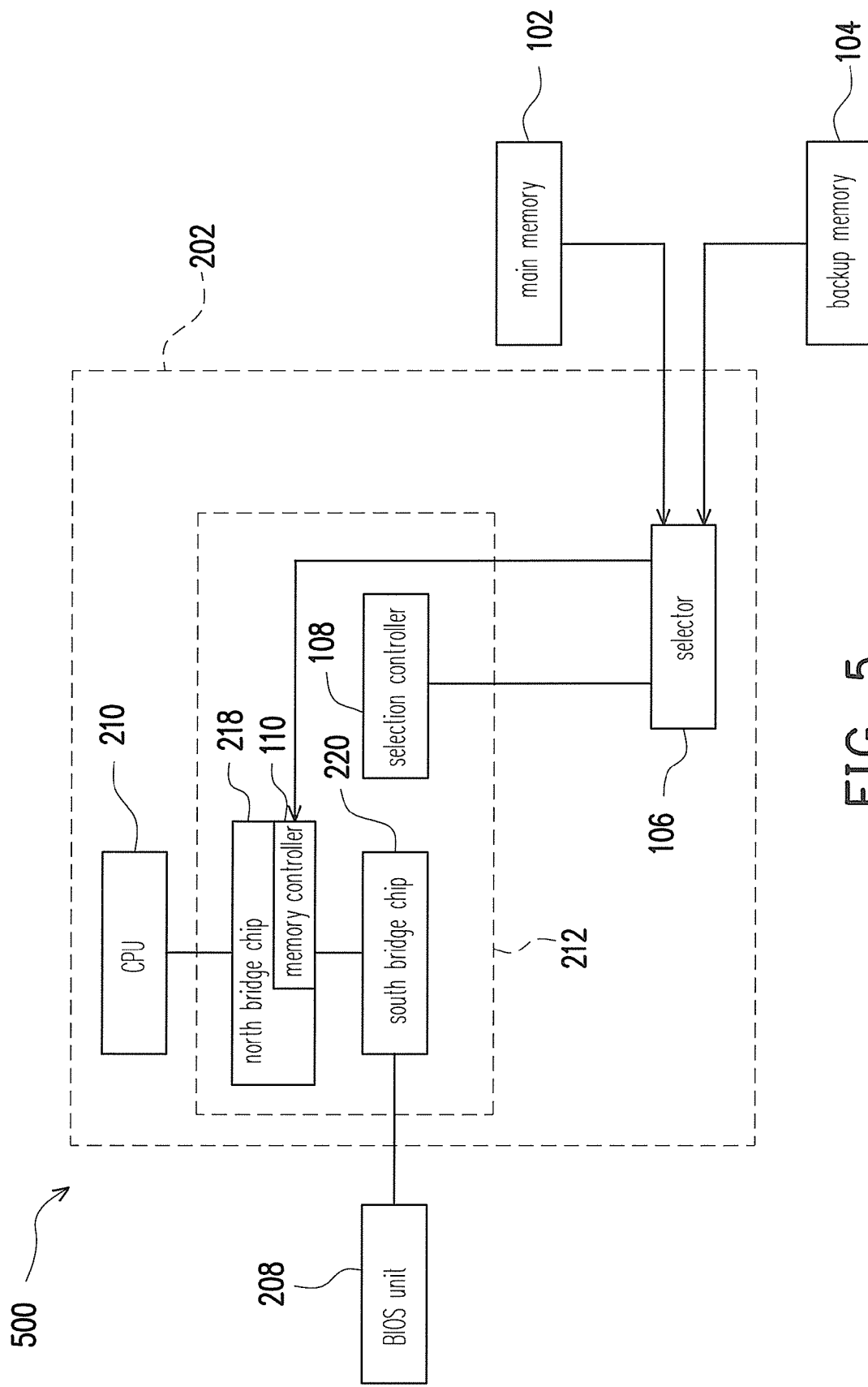
FIG. 5 is a schematic diagram showing a computer system according to another preferred embodiment of the invention.

FIG. 5 is a block diagram showing a computer system according to a second embodiment of the invention. The difference between the second embodiment and the first embodiment is that the memory controller 110 embedded in the CPU 210 also may be embedded in the north bridge chip 218 (as shown in FIG. 5). The selector 106 is coupled to the memory controller 110, the main memory 102 and the backup memory 104. When the CPU 210 wants to access the data, it may utilize the memory controller 110 to access the main memory 102 or the backup memory 104 via the selector 106 to boot the computer system 500. In the embodiment, the coupling modes and functions of other elements in the computer system 500 are the same with those in the first embodiment, which are not described herein for a concise purpose.

Third Embodiment

Figure 6:
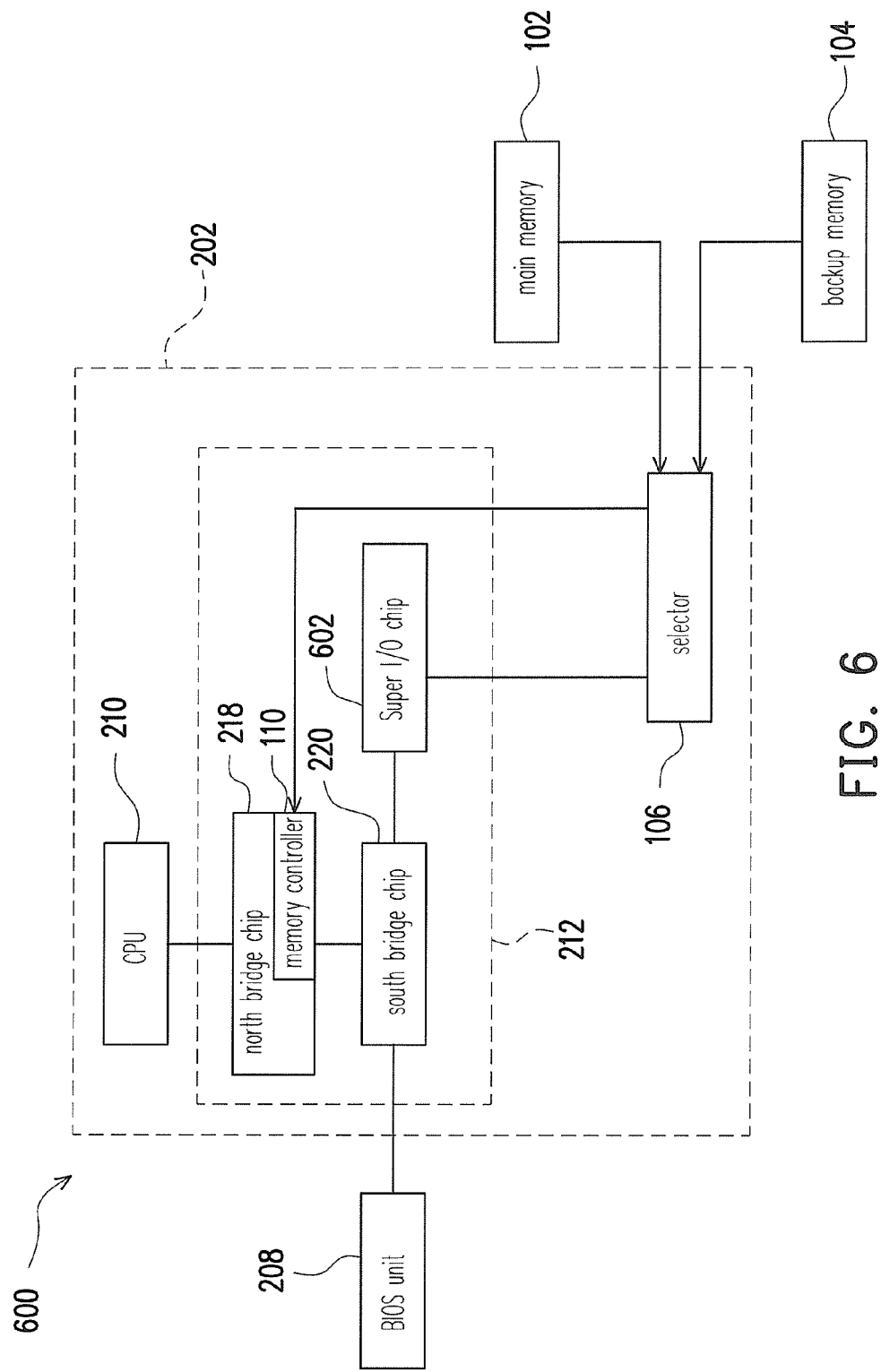
FIG. 6 is a schematic diagram showing a computer system according to still another preferred embodiment of the invention.

FIG. 6 is a block diagram showing a computer system according to a third embodiment of the invention. In the embodiment, the function of the selection controller 108 in the first embodiment may be realized by a super input/output (I/O) chip 602. The super I/O chip 602 may be coupled to the south bridge chip 220 and the selector 106, and the selector 106 may be coupled to the super I/O chip 602, the memory controller 110, the main memory 102 and the backup memory 104. When the main memory 102 fails to operate normally, the super I/O chip 602 may output a selection signal to the selector 106. After receiving the selection signal, the selector 106 may be coupled to the backup memory 104 instead of the main memory 102. Thus, the memory controller 110 may access the backup memory 104 to boot the computer system 600.

In the embodiment, the coupling modes and the functions of other elements in the computer system 600 are the same with those in the first embodiment, and they are not described herein for a concise purpose. In addition, although the memory controller 110 in the embodiment is embedded in the north bridge chip 218, the application is not limited thereto.

To sum up, the computer system may be booted by itself when the memory is incompatible. In addition, the computer system may adjust by itself and find out the most proper memory parameter. If the parameters allowing the computer system to operate stable cannot be obtained, the user may be prompted about error detecting result and guided to solve the problem.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of.

What is claimed is:

1. A method for booting a computer system, the computer system having a main memory, the method comprising the steps of:
    providing a backup memory;
    when the computer system is booted, and the main memory fails to operate normally, replacing the main memory by the backup memory; and
    decompressing program codes of a BIOS to the backup memory to perform a backup booting procedure, wherein the backup booting procedure comprises the steps of:
        providing a prompt relating to problem information of the main memory;
        providing a prompt relating to whether to perform a memory auto-adjustment procedure;
        when the memory auto-adjustment procedure is started, actively adjusting an electrical parameter of the main memory; and
        when the memory auto-adjustment procedure is not started, entering a setting interface of the BIOS.

2. The method according to claim 1, wherein when the computer system is booted, and the main memory is checked to be normal, the program codes of the BIOS is decompressed to the main memory to finish a normal booting procedure of the computer system.

3. The booting method according to claim 1, wherein the step when the computer system is booted comprises the steps of:
    actuating a watchdog timer and generating a time counting value;
    determining whether the main memory passes a memory test procedure before the time counting value reaches a preset time;
    if the main memory fails to pass the memory test procedure when the time counting value equals to the preset time, determining the main memory to be failed to operate normally; and
    if the main memory passes the memory test procedure before the time counting value reaches the preset time, determining the main memory to be normal and clearing the watchdog timer.

4. The method according to claim 1, further comprising the step of initializing the backup memory when the backup memory is selected to replace the main memory.

* * * * *